(12) United States Patent
Van Den Goorbergh

(10) Patent No.: US 6,783,667 B1
(45) Date of Patent: Aug. 31, 2004

(54) SCREEN UNIT FOR VISCOUS MASS

(75) Inventor: Jan J. M. Van Den Goorbergh, Heerlen (NL)

(73) Assignee: Goya B.V. (NL)

( * ) Notice: Subject to any disclaimer, the term of this patent is extended or adjusted under 35 U.S.C. 154(b) by 0 days.

(21) Appl. No.: 10/181,190
(22) PCT Filed: Jan. 24, 2000
(86) PCT No.: PCT/EP00/00558
§ 371 (c)(1),
(2), (4) Date: Sep. 30, 2002
(87) PCT Pub. No.: WO01/54793
PCT Pub. Date: Aug. 2, 2001
(51) Int. Cl.[7] ............................ B01D 29/66; B29C 47/68
(52) U.S. Cl. .................... 210/108; 210/411; 210/414; 210/137; 210/489; 210/499
(58) Field of Search ................................. 210/108, 107, 210/413, 414, 489, 499, 137, 411, 355

(56) References Cited

FOREIGN PATENT DOCUMENTS

| WO | WO 97/22456 | * 6/1997 | |
|---|---|---|---|
| WO | WO 9847688 A1 | * 10/1998 | ........... B29C/47/68 |

* cited by examiner

Primary Examiner—Terry K. Cecil
(74) Attorney, Agent, or Firm—Hartman & Hartman, P.C.; Gary M. Hartman; Domenica N.S. Hartman

(57) ABSTRACT

A screen unit for removing solid particles from a viscous mass, for example molten plastic. The screen unit includes a housing provided with a supply channel and a discharge channel for the viscous mass, a screen element in the housing between the supply channel and discharge channel, a backflush channel for discharging during backflushing solid particles screened by the screen element and connected to an outflow channel by a shutoff valve, and a pressure element which can be operated to flush back the viscous mass through the screen element at a pressure higher than the pressure in the supply channel. The shutter element is placed along the screen element, and the shutter element is caused to move with respect to the screen element such that during the screening phase the screen element is gradually more exposed for screening and during the backflushing phase the screen element is gradually less exposed to the backflushing action.

10 Claims, 3 Drawing Sheets

SCREEN UNIT FOR VISCOUS MASS

CROSS REFERENCE TO RELATED APPLICATIONS

This application claims the benefit of International Application No. PCT/EP00/00558, filed Jan. 24, 2000.

BACKGROUND OF THE INVENTION

The invention relates to a screen unit for removing solid particles from a viscous mass, for example molten plastic, comprising a housing provided with a supply channel and a discharge channel for the viscous mass, a screen element in the housing between the supply channel and discharge channel, means for cleaning the screen element by means of backflushing, which means comprise a backflush channel for discharging during backflushing solid particles screened by the screen element and connected to an outflow channel by a shut-off valve and a pressure element which can be operated to flush the viscous mass back through the screen element at a pressure higher than the pressure in the supply channel.

Such a screen unit is known from WO-A-9847688.

In this known device backflushing is obtained by means of an external pressure agent which increases the pressure of the mass behind the screen, whereas at the same time a discharge valve located at the upstream end of the screen is opened whereby the liquid flows through the screen and then removes the solid particles contained by it.

This known device has a number of disadvantages. In the first place the pressure drop over the screen is gradually increasing during the screening phase because the screen is gradually filled up with the solid particles. Otherwise during the backflushing phase there is also pressure difference occurring along the screen which is dependent upon the location on the screen, whereby the cleaning of the screen lacks uniformity. Because of this the dimensions of the screen have to be limited. Also the use of rings as disclosed in WO-A-9847688 restricts the diameter of the screen.

BRIEF SUMMARY OF THE INVENTION

It is an object of the invention to provide a screen unit of the above mentioned type in which the above mentioned disadvantages have been avoided.

This and other objects are obtained in that a shutter element is placed along the screen element and that means are provided to move the shutter element with respect to the screen element such that during the screening phase the screen element is gradually more exposed for screening and during the backflushing phase the screen element is gradually less exposed to the backflushing action.

By means of the shutter element it becomes possible to use gradually the screen both during screening and during backflushing whereby the pressure differences over the screen can be maintained at a constant level thereby improving the efficiency of the screening and of the backflushing.

BRIEF DESCRIPTION OF THE DRAWINGS

Other characteristics and advantages of the invention will become clear from the following description, reference being made to the annexed drawings, in which.

DETAILED DESCRIPTION OF THE INVENTION

Figure 1:
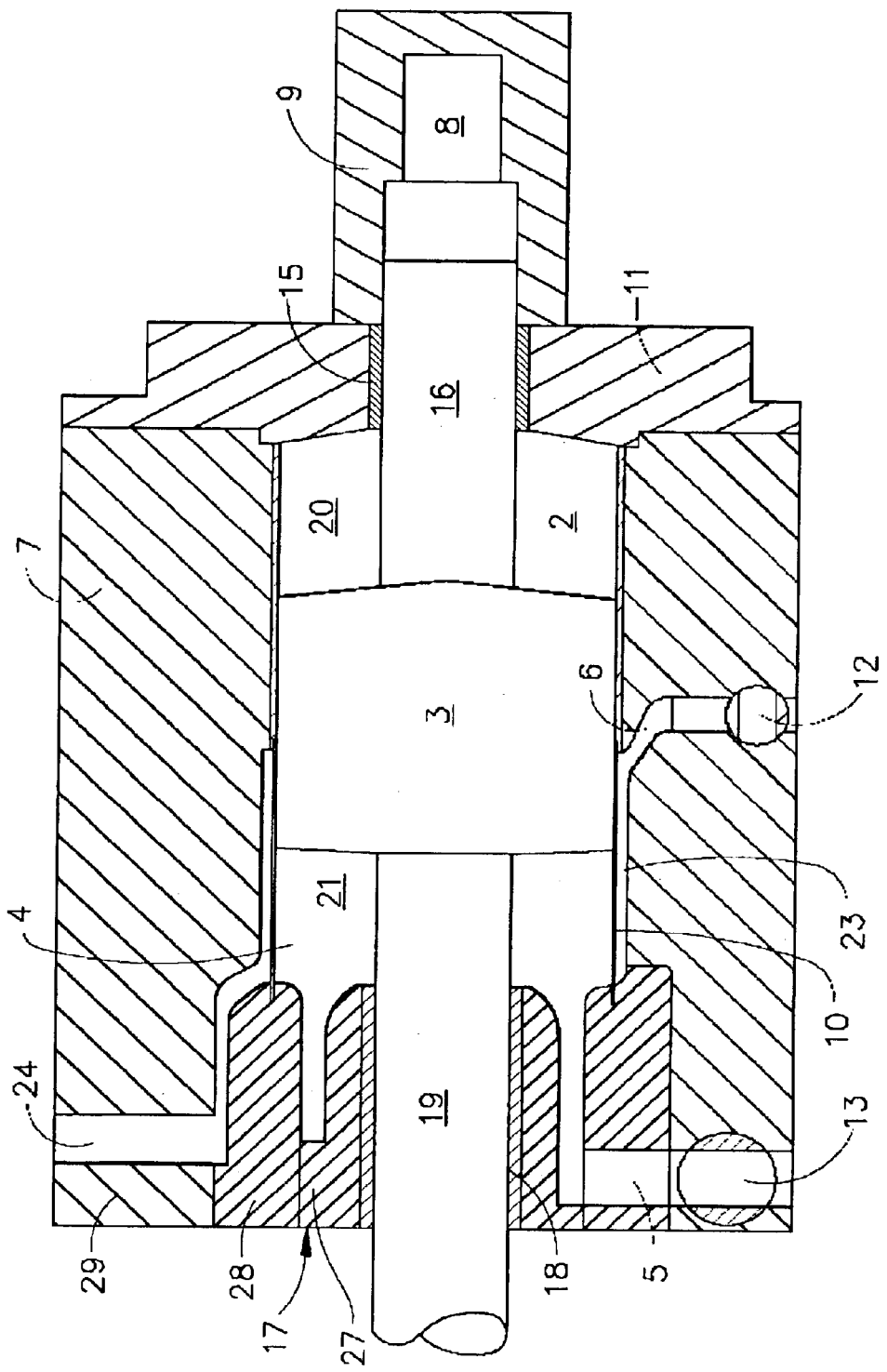
FIG. 1 is a schematic cross-section of a screen unit according to the invention.

As shown in FIG. 1, the screen unit according to the invention comprises a housing 7 having a cylindrical chamber 2 extending over the whole length of the housing 7. One end of the cylindrical chamber 2 is covered by a plate 11 provided with a cylindrical opening 15 providing a guide for a piston rod 16 as will be explained below. The cylindrical opening 15 is covered by a pressure chamber 9 filled with a pressure fluid 8. The pressure chamber 9 is connected to a control system (not shown) by means of which the pressure of the pressure fluid 8 can be controlled, so as to control the movement of the piston rod 16.

The other end of the cylindrical chamber 2 is closed by a cover 17 provided with a cylindrical opening 18 providing a guide for a piston rod 19. Both cylindrical openings 15 and 18 are coaxial with the cylindrical chamber 2, so that they are aligned and both are connected to opposing surfaces of a piston 3 movable within the cylindrical chamber 2.

The cylindrical chamber 2 is composed of two parts, one part 20 having a cross-section substantially corresponding to the cross-section of the piston 3 and a second part 21 having a slightly larger diameter. In the second part 21 a filter screen 10 has been fixed having a general cylindrical bush shape and with an internal diameter substantially corresponding to the diameter of the piston 3 and aligned with the inner wall of the first part 20 of the cylindrical chamber 2. The filter screen 10 divides the second part 21 of the chamber 2 to define an interior space 4 circumferentially surrounded by a bush-like space 23.

The construction of the screen 10 itself can be identical to the screen as disclosed in WO-A-9847688, but other screen constructions can be used as well e.g. perforated screens. The housing 7 and the filter screen 10 defines a bush like cylindrical space 23 around the screen 10. A channel 6 extends through the housing 7 and is provided with a valve 12. This channel 8 is further connected to a collector (not shown) for collecting the solid particles retained by the screen 10 and removed therefrom during the backflushing phase.

The cover 17 has a complicated shape, as shown in FIG. 1 and consists essentially of a central part 27 provided with the bore 18 which serves as a guide for the piston rod 19. Further the cover 17 comprises an intermediate part 28 and an outer ring-shaped part 29. The parts 28 and 29 are shaped in such a way that they provide a channel 24 connecting the bush-like space 23 with a supply of viscous mass from which the particles must be removed. Otherwise, the parts 27, 28 and 29 together with the housing 7 form a channel 5 connecting their interior space 4 within the second part 21 of the chamber 2 with a collector or any other equipment (not shown) for the screened material. In the channel 5 there is provided a valve 13.

Figure 2:
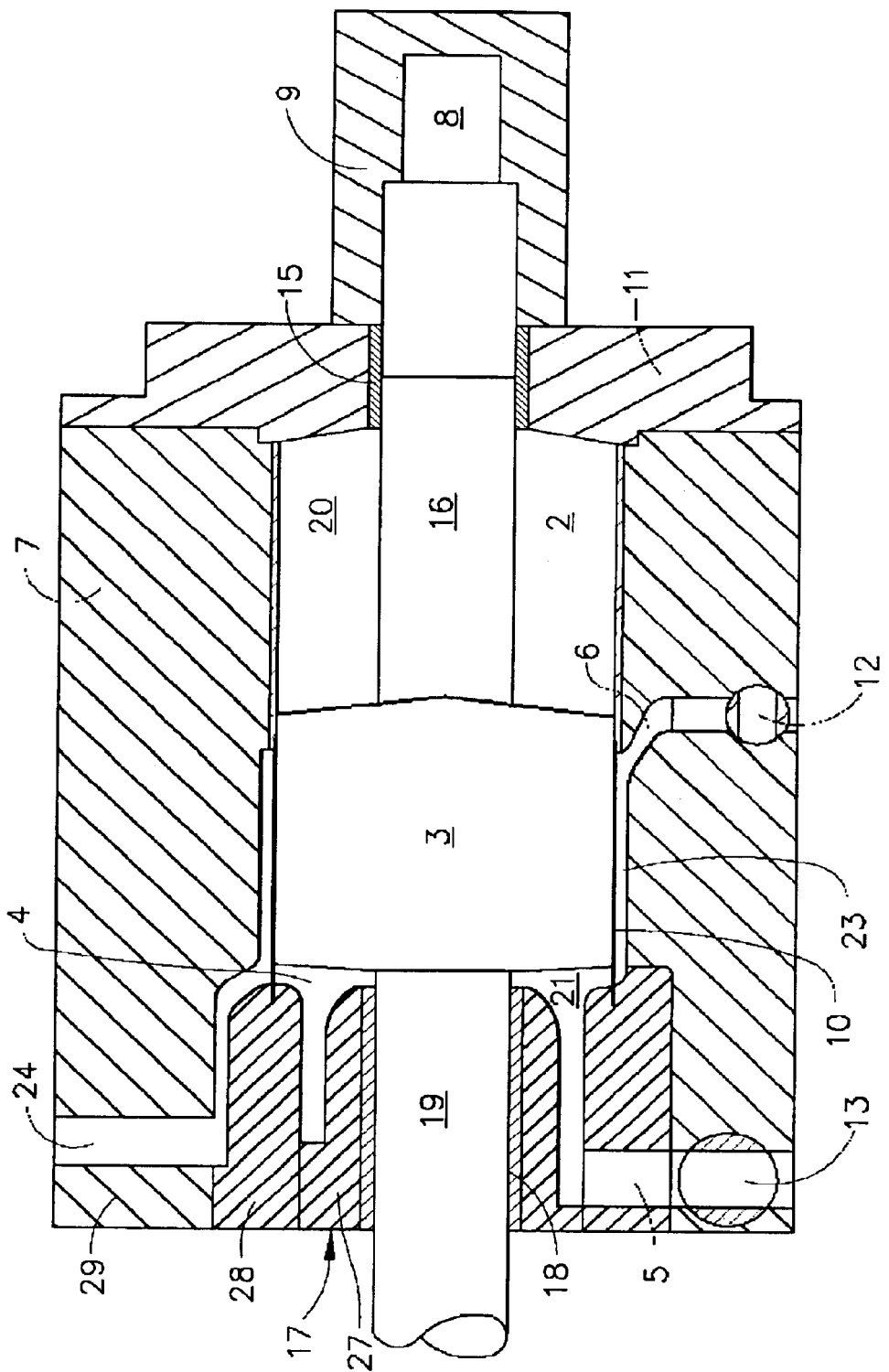
FIG. 2 is a cross-section corresponding to FIG. 1 in a position at the start of the screening phase.

The operation of this device is as follows:

Assuming that the piston is in the position shown in FIG. 2 and that the screen is clean, a viscous mass containing solid particles is supplied through channel 24 to the bush-like space 23. Valve 12 being closed the viscous mass is pressed through the exposed part of the screen 10, whereas the cleaned mass is evacuated through channel 5 and can be supplied either to a receptacle or to a device for further processing this mass.

As a result of the flow resistance generated by the screen 10 there is a pressure difference between the space 23 and 21. As solid particles will be retained by the screen 10, this pressure difference will increase, as a result of a decrease of available screen surface. By measuring this pressure difference it is possible to have a control system which will move the piston 3 in FIG. 2 to the right, thereby exposing more screen surface to the flowing mass. In this way, the pressure drop is compensated, and the outlet pressure of the viscous mass can be maintained at a substantially constant level, which is important if the screening unit is on line with a further processing unit.

Figure 3:
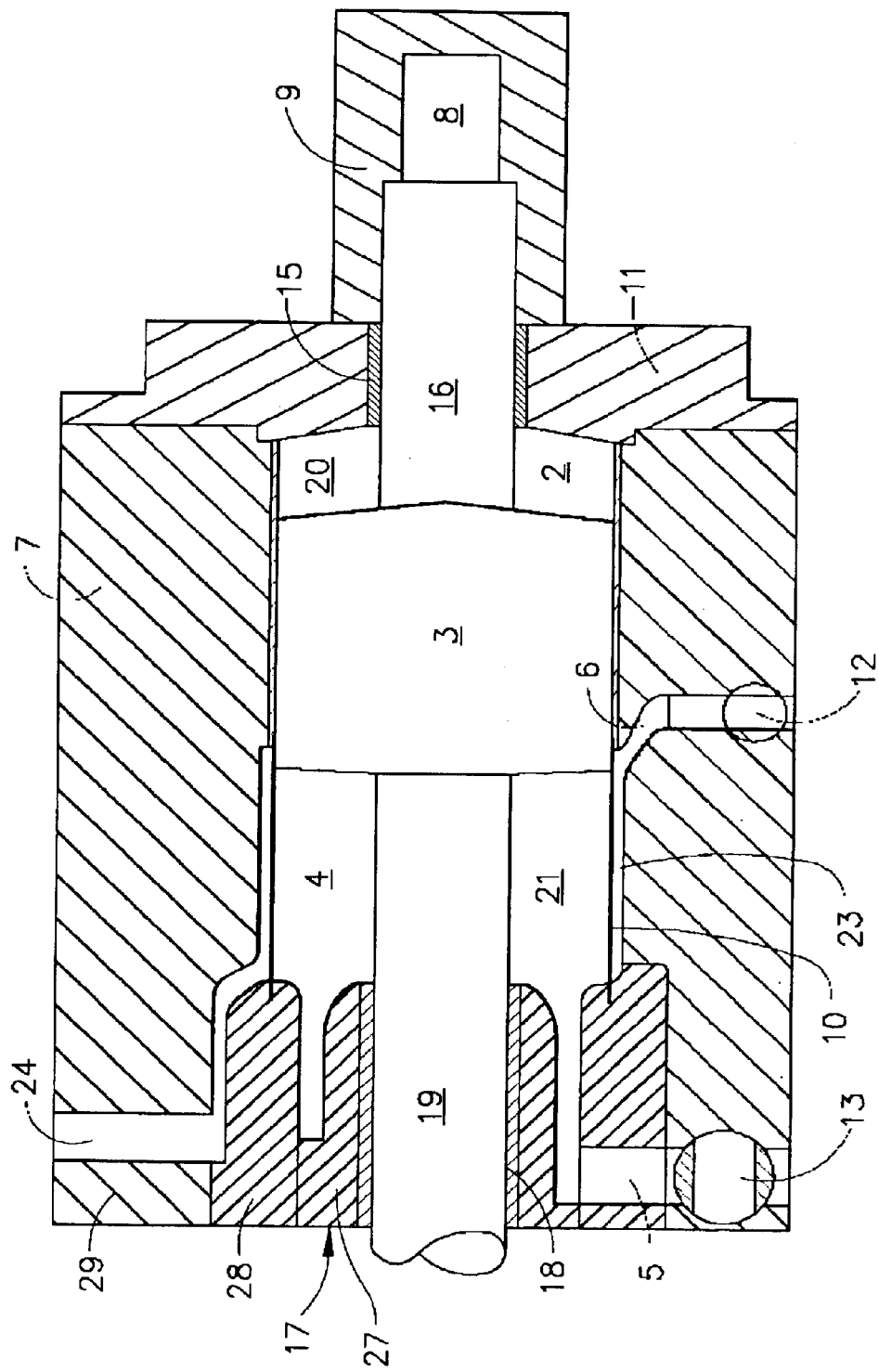
FIG. 3 is a cross-section corresponding to FIG. 1 in a position at the start of the backflushing phase.

After some time the piston has arrived in the position shown in FIG. 3. In this situation further obstruction of the screen 10 and the copending increasing pressure difference between the bush-like space 23 and the interior space 4 cannot anymore be compensated by further movement of the piston 3 in order to increase exposed screen surface. At this moment the screening phase will be stopped.

In order to clean the screen, backflushing is applied. This is obtained by closing channel 5 by means of valve 13 and opening valve 12 in channel 6. By means of a pressure increase in chamber 9 the piston 3 is moved to the left in FIG. 3, whereby the pressure in interior space 4 becomes higher than in the bush-like space 23. Cleaned mass is pressed through the screen 10 from the interior space 4 to space 23 and thereby the solid particles in the screen 10 are removed therefrom and are released through channel 6.

Upon movement of the piston 3 to the left in FIG. 3, part of the screen surface is covered, which part is gradually increasing in magnitude. In this way the cleaning pressure, which must be relatively high can be maintained over the whole length of the screen 10.

As soon as piston 3 has reached the position shown in FIG. 2, valve 12 is closed and valve 13 opened and the screening phase can start again.

What is claimed is:

1. A screen unit for removing solid particles from a viscous mass, the screen unit comprising:
    a housing having a supply channel and a discharge channel for the viscous mass;
    a screen element in the housing between the supply channel and discharge channel, the screen element being operable to screen solid particles from the viscous fluid during a screening phase during which the viscous mass flows through the housing from the supply channel to the discharge channel;
    means for cleaning the screen element by backflushing the viscous mass through the screen element during a backflushing phase, the cleaning means comprising a backflush channel for discharging during the backflushing phase the solid particles screened by the screen element during the screening phase, an outflow channel through which the solid particles exit the housing during the backflushing phase, a shut-off valve between the backflush channel and the outflow channel, and pressure-generating means for causing the viscous mass to backflush through the screen element at a pressure higher than a pressure in the supply channel;
    a shutter element disposed along the screen element; and
    means for moving the shutter element with respect to the screen element, the moving means being operable to increasingly expose more of the screen element to the viscous mass substantially throughout the screening phase, and to decreasingly expose less of the screen element during the backflushing phase.

2. A screen unit according to claim 1, wherein the screen element has a cylindrical shape and the shutter element is received within the screen element.

3. A screen unit according to claim 2, wherein the shutter element has a cylindrical shape.

4. A screen unit according to claim 2, wherein the shutter element and the pressure-generating mean comprise a piston reciprocably disposed within the screen element.

5. A screen unit according to claim 1, wherein the screen unit comprises a plurality of the screen and shutter elements within the housing in a parallel relationship.

6. A screen unit according to claim 1, wherein the screen and shutter elements are concentrically shaped.

7. A screen unit according to claim 1, wherein the screen element comprises screening openings defined by at least two parallel screen plates in contact with each other and each having a number of screening openings, and wherein the screening openings of the screen element are defined by adjusting one of the screen plates with respect to a second of the screen plates.

8. A screen unit according to claim 1, wherein the means for moving the shutter element with respect to the screen element is operable to maintain a substantially constant pressure at the discharge channel during the screening phase.

9. A screen unit according to claim 1, wherein the means for moving the shutter element with respect to the screen element is operable to decreasingly expose less of the screen element substantially throughout the backflushing phase.

10. A screen unit for removing solid particles from a viscous mass, the screen unit comprising:
    a housing having a supply channel, a discharge channel, and a chamber therebetween;
    a screen element within the chamber and between the supply channel and discharge channel, the screen element being operable to screen solid particles from the viscous fluid during a screening phase during which the viscous mass flows through the housing from the supply channel and through the chamber to the discharge channel;
    a backflush channel fluidically communicating with the chamber for receiving during a backflushing phase the solid particles screened by the screen element during the screening phase;
    a piston reciprocably received within the chamber so as to be reciprocable within the screen element, the piston being operable to clean the screen element by causing the viscous mass to backflush through the screen element at a pressure higher than a pressure in the supply channel during the backflushing phase;
    means for moving the piston with respect to the screen element, the moving means being operable to cause the piston to increasingly expose more of the screen element to the viscous mass throughout the screening phase so as to maintain a substantially constant pressure at the discharge channel during the screening phase, and to cause the piston to decreasingly expose less of the screen element substantially throughout the backflushing phase.

\* \* \* \* \*